United States Patent [19]

Novotny et al.

[11] 4,104,205

[45] Aug. 1, 1978

[54] MICROWAVE DEVULCANIZATION OF RUBBER

[75] Inventors: Donald S. Novotny, Windsor, Vt.; Richard L. Marsh, Springfield, Mo.; Frank C. Masters, Palmyra, Nebr.; David N. Tally, Arvada, Colo.

[73] Assignee: The Goodyear Tire & Rubber Company, Akron, Ohio

[21] Appl. No.: 646,821

[22] Filed: Jan. 6, 1976

[51] Int. Cl.$^2$ ................................................. C08F 2/46
[52] U.S. Cl. .............................. 260/2.3; 204/159.17; 204/159.18; 204/159.2; 264/26; 264/DIG. 46
[58] Field of Search ................ 260/2.3; 204/159.18, 204/159.2, 159.17; 264/26, DIG. 46

[56] References Cited

U.S. PATENT DOCUMENTS

| | | | |
|---|---|---|---|
| 3,725,314 | 4/1973 | Pelofsky | 260/2.3 |
| 3,766,031 | 10/1973 | Dillon | 204/159.2 |
| 3,773,638 | 11/1973 | Gotoh et al. | 204/159.2 X |
| 3,937,774 | 2/1976 | Wiley et al. | 264/26 |

Primary Examiner—Murray Tillman
Assistant Examiner—T. DeBenedictis, Sr.
Attorney, Agent, or Firm—R. H. Haas

[57] ABSTRACT

Elastomer waste may be devulcanized without depolymerization to a material capable of recompounding and revulcanization into a product having physical properties essentially equivalent to the original vulcanizate. Devulcanization is accomplished by application of a controlled dose of microwave energy to sized material, preferably in a continuous process.

10 Claims, No Drawings

MICROWAVE DEVULCANIZATION OF RUBBER

BACKGROUND OF THE INVENTION

This invention relates to a novel method for the devulcanization of rubber by the use of microwave energy which results in the production of a material which can be recompounded and revulcanized into a new vulcanized rubber article. The devulcanization process is accomplished by the application of microwave energy to sized vulcanized rubber waste employing a controlled dose, dose rate and temperature. The method and product employed is useful in that it provides an economical, ecologically sound method of reusing elastomeric process waste to return it to the same process and products in which it was originally generated and in which it produces a similar product with equivalent physical properties which are not degraded when the material being recycled is in the amounts normally existing in the usual commercial processes currently being practiced.

PRIOR ART

It is known to employ microwave energy for many applications relating to rubber products. Examples of such known applications are vulcanization, bonding, preheating, drying, foaming, and foam curing. It is also known to employ microwave energy as well as irradiation to depolymerize rubber to form carbon black and liquid and gaseous hydrocarbons. It has not heretofore been known to employ microwave energy to devulcanize rubber to a state where it can be compounded and revulcanized to useful products requiring significant physical properties, such as a hose. The prior art discloses three methods of reclaiming rubber for reuse in additional rubber products. These methods are: mechanical, where the cured material is subjected to high shear to generate sufficient heat to devulcanize rubber (usually this occurs in a Banbury or high shear extruder); pan process, where the previously ground vulcanized material is heated in an autoclave at high temperatures for a long period of time until devulcanization takes place; and chemical, where cured rubber waste that contains textile material is devulcanized by heat and chemicals. However, these prior art reclaiming processes produce a product with poor physical properties and the material has generally been used in low percentages, 5 to 10, or in new articles of manufacture which did not require any significant physical properties, as for example automobile floor mats.

Applicants' invention is a method of devulcanizing sulfur-vulcanized elastomer containing polar groups which comprises applying a controlled dose of microwave energy in an amount sufficient to sever substantially all carbon-sulfur and sulfur-sulfur bonds and insufficient to sever significant amount of carbon-carbon bonds. The invention is a non-chemical, non-mechanical, single-stage method for devulcanizing such elastomers. Although various frequencies in the microwave spectrum could be employed by varying the dose and dose rate, as a practical matter only 915 and 2450 MHz are regulated for use in industrial processes of this type. The process is ecologically sound by recovering more than 95% of the total material needed in the process and no harsh chemicals are discharged into the environment. In addition, unvulcanized waste or unvulcanized waste containing some contamination from vulcanized pieces of similar material can be vulcanized and subsequently reclaimed in the same single stage process.

Articles produced from the material resulting from the process of the invention have good physical properties and such material can be employed in the production of articles requiring higher physical properties than could be accomplished with the prior art reclaim. When the material produced by the process of applicants' invention is mixed with new rubber compound in a ratio which reflects the total reuse of the commercial waste produced (in ranges which may run up to 10 or 15%) in a hose manufacturing process, the physical properties of the hose being produced are not noticeably degraded. Applicants have employed the process of the invention on vulcanized compounded EPDM scrap and have been able to return the product of the inventive process to the original manufacturing process and included in the regular manufacturing process to make hose of the same kind without loss of physical properties on the hose employing the devulcanized and revulcanized stock. Prior art reclaiming processes produce a material which is uneconomical due to the poor physical properties of the reclaim. This invention will enable an economic waste to be reused. Beyond this, as will be seen in the examples, the material resulting from the process of applicants' invention can be devulcanized and revulcanized a second time through the waste recycling process without significant loss of physical properties in the ultimate vulcanizate.

In reusing the material made by the practice of applicants' invention, it is necessary to compound it with conventional amounts of zinc oxide and the customary vulcanizing agents prior to subjecting it to the normal vulcanizing procedure. This contrasts with the prior art reclaimed rubber which requires vulcanizing agents but no zinc oxide to revulcanize. The vulcanizing agents and zinc oxide may be added to the devulcanized rubber either before or after it is blended with the virgin rubber. Alternatively, the devulcanized rubber, virgin rubber, curatives and zinc oxide may all be mixed simultaneously.

Subsequent to the devulcanization process, applicants found it desirable to pass the devulcanized material through a refining step and then to form the resulting smooth sheet into the conventional slab form for convenience in processing it through the conventional equipment present in rubber processing plants.

DETAILED DESCRIPTION OF INVENTION

Rubber Starting Material

In order to be usable in the process of the invention, the waste material must be polar in order that the microwave energy will generate the heat necessary to devulcanize. This polarity may be an inherent characteristic of the rubber compound itself, as for example polychloroprene, nitrile rubber, or chlorinated polyethylene. In addition, the polarity may be achieved as a result of some other material compounded into the rubber, for example carbon black. The size of the starting product must be reduced to a size where the material is reasonably compact when subjected to the microwave heating. Preferably it should be reduced to particles of a size able to pass through a quarter inch screen.

Microwave Source

The microwave energy may be produced by any of the numerous commercially available industrial microwave generators which are known to the art. Either single or multiple applicators may be employed in practicing the invention. The variables in the process are the dose, dose rate, frequency, and temperature. These variables, while demonstrated by the examples disclosed hereinafter, will vary depending upon the particular vulcanizate being processed but may also be varied with respect to each other on a given stock. In devulcanizing the elastomeric compounds generally employed today in manufacturing industrial products, such as belts and hose, the dose will generally be in the range from 75 to 100 watt-hours per pound and preferably from 85 to 95 watt-hours per pound; and the frequency which theoretically covers the microwave band of the electromagnetic spectrum will of necessity be restricted to 915 or 2450 MHz.

The most efficient relationship of dose, dose rate and frequency must be determined empirically for each specific elastomeric compound being devulcanized. Different types of carbon black are known to effect the devulcanization rate. In addition, if fillers such as silica are employed, the particle sizes of the silica will affect the devulcanizing rate.

Processing Equipment

The equipment employed in the invention may be either batch or continuous. The structure which contains the material to be devulcanized must be constructed of glass, ceramic or other material which is transparent to microwave. The best mode of practicing the invention known to applicants is the continuous method of operation. This latter method utilizes a glass or ceramic tube containing a glass, ceramic or steel auger to feed the stock through the tube and having a controllable speed which may be used to adjust the flow rate for different types of rubber. Surprisingly, applicants have found the steel auger to be preferred for this purpose. A batch process is more subject to generation of temperature gradients and hot spots in the rubber being subjected to the microwave treatment.

EXAMPLE 1

EPDM[1] hose end trim and butyl tire bladders were devulcanized by the process of the invention employing a 4 inches inside diameter glass tube feed with an auger having a 3.5 inch pitch which moved the rubber stock through the tube at the flow rate indicated. By operating the microwave generator at maximum capacity and varying the microwave dose by means of auger speed, the effect of microwave dose on physical properties such as oscillating disk rheometer torque (L) and tensile strength may be determined. Such data enables an operator to establish operating conditions which result in a devulcanized product equivalent to a virgin control elastomer sample.

[1]Ethylene-propylene-diene terpolymer consisting of a mixture of approximately equal proportions of hexadiene and norbornene types.

The process conditions and selected physical properties of the resulting depolymerized elastomers are shown in Table I.

TABLE I

PROCESSING CONDITIONS

| Run No. | Rubber Stock | Flow Rate lbs/hr | Temp °F. | Power Input KW | Magnetron Output KW | Auger Speed RPM |
|---|---|---|---|---|---|---|
| 1 | EPDM[1] | 8.5 | 760 | 2.6 | 1.50 | (3) |
| 2 | EPDM[1] | 16.0 | 500 | 2.6 | 1.50 | 1.70 |
| 3 | IIR[2] | 13.5 | 500 | 2.2 | 1.25 | 1.45 |

TABLE I-continued

PHYSICAL PROPERTIES

| ODR[4] Value | Devulcanized EPDM Devulcanized EPDM From Run No. 2 | EPDM Control |
|---|---|---|
| Min L | 11 | 10 |
| Max L | 51 | 51 |
| T Δ 2 | 2.3 | 2.5 |

Devulcanized IIR

| | Trial 1 | Trial 2 | Trial 3 | Trial 4 | Control | 50%[5] |
|---|---|---|---|---|---|---|
| Tensile psi | 300 | 750 | 1250 | 1300 | 1520 | 1210 |
| Elongation % | 500 | 500 | 370 | 400 | 835 | 670 |
| Hardness Shore A | 80 | 78 | 80 | 71 | 55 | 72 |

[1]Ethylene-propylene-diene terpolymer consisting of a mixture of approximately equal proportions of hexadiene and norbornene types.
[2]Isobutene-isoprene (butyl) rubber.
[3]Batch process.
[4]Oscillating disk rheometer (ODR).
[5]50/50 mixture of control IIR and devulcanized IIR, parts by weight.

EXAMPLE 2

A vulcanizate, consisting of EPDM of the type used in Example 1, was devulcanized by the process of the invention. Portions of this devulcanized material were mixed with virgin EPDM in the percents by weight shown in Table II. When conventionally compounded, the physical properties of these materials were equivalent to those of the conventionally compounded virgin control EPDM elastomer as shown in Table II. The 26% devulcanized material utilized in Sample No. 4 was derived from the vulcanizate of Sample Run Nos. 2 and 3 demonstrating that the recycling of material previously recycled does not detrimentally affect the physical properties of such a vulcanizate.

TABLE II

| Sample No. | 1 | 2 | 3 | 4 |
|---|---|---|---|---|
| % Devulcanized EPDM | None | 18 | 26 | 26 |
| 200% Modulus psi | 1000 | 1060 | 960 | 1040 |
| Tensile psi | 1240 | 1340 | 1140 | 1230 |
| Elongation % | 315 | 375 | 330 | 290 |
| Hardness Shore A | 73 | 70 | 71 | 71 |
| MS at 270° F. | | | | |
| Low | 30 | 24 | 24 | 21 |
| Mins. to 10 pt. rise | 20+ | 20+ | 20+ | 20+ |
| Pts. rise in 20 mins. | 6 | 2 | 3 | 3 |
| ODR Value | | | | |
| Min L | 8.2 | 7.0 | 6.7 | 6.9 |
| Max L | 44.0 | 38.2 | 36.7 | 37.4 |
| T Δ 2 | 2.0 | 2.1 | 2.1 | 2.05 |
| t c 90 | 4.7 | 4.7 | 4.55 | 4.5 |
| % Compression Set (70 hrs at 250° F.) | 44 | 51 | 50 | 48 |

EXAMPLE 3

Physical properties of batch and continuous devulcanized EPDM[1] compared with the conventional EPDM[1] control are shown in Table III.

TABLE III

| Sample | 1 | 2 | 3 | EPDM[1] Control |
|---|---|---|---|---|
| Type Process | Batch | Batch | Continuous | — |
| % Devulcanized EPDM[1] | 100 | 100 | 100 | None |
| Min L | 5.8 | 2.0 | 11 | 10 |
| Max L | 27 | 5.5 | 51 | 51 |
| T Δ 2 | 2.1 | 3.1 | 2.3 | 2.6 |
| 90% Max L | 21.2 | 3.5 | 40 | 41 |
| Cure Time(Min)/Temp(° F.) | 20/320 | 20/320 | 11/360 | 20/320 |
| Tensile psi | 1044 | 348 | 1430 | 1600 |
| Elongation % | 200 | 120 | 175 | 300 |
| Specific Gravity | 1.25 | 1.25 | 1.15 | 1.15 |
| Hardness Shore A | 65 | — | 66 | 67 |

TABLE IV

| Composition EPDM[1] | Hose Physical Properties | | |
|---|---|---|---|
| | 10% Devulcanized 90% Virgin Tube | 25% Devulcanized 75% Virgin Tube | 100% Virgin Tube |
| Original | | | |
| Tensile psi | 1190 | 1080 | 1057 |
| Elongation % | 300 | 250 | 375 |
| 200% Modulus psi | 65 | 66 | 68 |
| | 930 | 925 | 760 |
| Oven Aged 168 hrs/250° F. | | | |
| Tensile psi | — | 1170 | 1268 |
| Elongation % | — | 180 | 187 |
| Hardness Shore A | — | 71 | 79 |
| 70 hrs at Boiling Point in 2% Water Solution of Kerns United 4289R | | | |
| Tensile psi | 1260 | — | 1115 |
| Elongation % | 250 | — | 355 |
| Hardness Shore A | 60 | — | 58 |
| Vol Swell % | 10.1 | — | 9.4 |
| 70 hrs/250° F. Compression Set | | | |
| Hose | — | — | 81 |
| Tube | 70.9 | — | 60 |
| Burst psi | 160 | — | 161 |
| Adhesion Tube & Cover ppiw | 23 | — | 16.6 |

| | Open Steam Vulcanized Sheet Properties | | |
|---|---|---|---|
| | Virgin EPDM[1] | Devulcanized EPDM[1] | 25% Devulcanized 75% Virgin EPDM[1] |
| Original | | | |
| Tensile psi | 1115 | 1430 | 1340 |
| Elongation % | 365 | 175 | 275 |
| Hardness Shore A | 74 | 66 | 68 |
| 200% Modulus psi | 920 | — | 1140 |
| Oven Aged 168 hrs/250° F. | | | |
| Tensile psi | 1360 | 1380 | 1370 |
| Elongation % | 215 | 125 | 185 |
| Hardness Shore A | 76 | 72 | 71 |
| 70 hrs at Boiling Point in 2% Water Solution of Kerns United 4289R | | | |
| Tensile psi | 1270 | 1100 | 1400 |
| Elongation % | 360 | 140 | 260 |
| Hardness Shore A | 66 | 61 | 61 |
| Vol Swell % | 5 | 7.4 | 8.6 |
| 70 hrs/250° F. Compression Set | 53 | 51.7 | 48.2 |

[1]Ethylene-propylene-diene terpolymer consisting of a mixture of approximately equal proportions of hexadiene and norbornene types.

TABLE III-continued

| Sample | 1 | 2 | 3 | EPDM[1] Control |
|---|---|---|---|---|
| MS 250° F. Low | 16 | 8 | 25.5 | 25.5 |
| Min to 10 pt. rise | 30+ | 30+ | 30+ | 30+ |

[1]Ethylene-propylene-diene terpolymer consisting of a mixture of approximately equal proportions of hexadiene and norbornene types.

EXAMPLE 4

Devulcanized EPDM[1] was used as a 25% addition to freshly compounded EPDM[1]. This mixture was then compounded with zinc oxide and conventional curatives, made into hose tubing, knitted reinforcement was added, and the tube was covered with 100% freshly compounded EPDM. This hose construction was vulcanized and tested. The test results are listed in Table IV.

EXAMPLE 5

Tire tread material was run through a cutting machine and reduced in size to pass through a half-inch screen. The material was then augered through the microwave oven. The microwave energy was varied between 750 and 1500 watts. The flow rate and the temperature at the exit of the oven were monitored. As the various conditions reached steady state, samples were taken. The samples were banded on a mill, vulcanizing ingredients were added, and physical properties measured.

TABLE V

| Sample No. | Control* | 1 | 2 | 3 | 4 | 5 | 6 | 7 |
|---|---|---|---|---|---|---|---|---|
| | RESULTS | | | | | | | |
| Watts (Output) | — | 750 | 875 | 1000 | 1125 | 1250 | 1375 | 1500 |
| Output Temp ° F. | — | 480 | 500 | 520 | 535 | 555 | 570 | 650 |
| Flow Rate lbs/hr | — | 18 | 17.7 | 17.5 | 17.2 | 17.0 | 16.7 | 16.3 |
| Tensile psi | 2220 | 1300 | 1175 | 1250 | 1100 | 880 | 700 | 500 |
| Elongation % | 740 | 200 | 260 | 200 | 225 | 200 | 150 | 170 |
| 100% Modulus | — | 500 | 300 | 400 | 320 | 300 | 375 | 280 |
| 300% Modulus | 682 | — | — | — | — | — | — | — |

TABLE V-continued

| Sample No. | Control* | RESULTS 1 | 2 | 3 | 4 | 5 | 6 | 7 |
|---|---|---|---|---|---|---|---|---|
| Oscillating Disk Rheometer* | | | | | | | | |
| T Δ 2 | — | 1.05 | 1.05 | 1.05 | 1.2 | 1.1 | 1.1 | 0.8 |
| T 90% | 3.0 | 1.9 | 2.25 | 2.1 | 2.6 | 2.85 | 2.7 | 2.05 |
| Max L | 25.5 | 55 | 36 | 41 | 36.5 | 33 | 32.5 | 41 |
| Min L | — | 27 | 12.5 | 11 | 11.5 | 11 | 11.5 | 5.5 |
| Specific Gravity | 1.147 | 1.18 | 1.16 | 1.17 | 1.16 | 1.17 | 1.17 | 1.18 |
| Hardness Shore A | 63 | 65 | 61 | 62 | 61 | 60 | 61 | 66 |

*The rheometer setting for the control was 375° F. and 1° arc. For all other measurements it was 350° F. and 3° arc.

The most notable difference between tire tread material and EPDM hose compound is the exothermic reaction that takes place at about 500° F. Also, the tire tread material is more tacky at these temperatures. This causes a reduced flow rate at constant auger speed. Control of the microwave energy absorbed is therefore more difficult. The exothermic reaction may be controlled by devulcanizing in a nitrogen atmosphere.

The process proceeded very well between 480° F. and 650° F. producing a material which could be recured. The best operating conditions, as shown by the table of results, are 1000 watts at 17.5 lb/hr, giving an exit temperature of 520° F.

While certain representative embodiments and details have been shown for the purpose of illustrating the invention, it will be apparent to those skilled in this art that various changes and modifications may be made therein without departing from the spirit or scope of the invention.

What is claimed is:

1. The method of devulcanizing sulfur-vulcanized elastomer containing polar groups which comprises applying a controlled dose of microwave energy of between 915 and 2450 MHz and between 41 and 177 watt-hours per pound in an amount sufficient to sever substantially all carbon-sulfur and sulfur-sulfur bonds and insufficient to sever significant amount of carbon-carbon bonds.

2. The method of claim 1 wherein the elastomer is in continuous motion while present in the microwave field.

3. The method of claim 2 wherein the elastomer is maintained in continuous motion by means of a steel auger.

4. The method of claim 1 wherein the microwave frequency is between 915 and 2450 MHz; the dose is between 75 and 100 watt-hours per pound; and the elastomer temperature is between 450° and 800° F.

5. The method of claim 1 wherein the elastomer is maintained in continuous motion by means of a steel auger while present in the microwave field; the microwave frequency is between 915 and 2450 MHz; the dose is between 41 and 177 watt-hours per pound; and the elastomer temperature is between 450° and 800° F.

6. The method of claim 1 wherein the elastomer is ethylene-propylene-diene rubber.

7. The method of claim 2 wherein the elastomer is ethylene-propylene-diene rubber.

8. The devulcanized elastomeric product made by the process of claim 1.

9. The devulcanized elastomeric product made by the process of claim 2.

10. The method of claim 5 wherein the elastomer is ethylene-propylene-diene rubber.

* * * * *